United States Patent Office 2,908,613
Patented Oct. 13, 1959

2,908,613

RESERPINE-ACETAMIDE HYPOTENSIVE COMPOSITIONS

Gustav J. Martin and Jay Morton Beiler, Philadelphia, Pa., assignors to The National Drug Company, Philadelphia, Pa., a corporation of Delaware No Drawing. Application July 20, 1954
Serial No. 444,643

7 Claims. (Cl. 167—67)

This invention relates to and has for its object the provision of novel compositions (and methods for their preparation), useful as medicinals especially in the treatment of hypertension. The compositions of this invention comprise combinations of rauwolfia (or its more concentrated active ingredient, reserpine) with certain acetamides.

Rauwolfia is a dried extract of plants of the rauwolfia family, especially *Rauwolfia serpentina*. These extracts usually contain about 30% by weight of the alkaloids of the plant. However, the amount of alkaloids in the extract is not uniform and may vary from about 3% to about 9%. The active alkaloid in the extract is reserpine and both the reserpine and the parent rauwolfia are known to be useful in the treatment of hypertension.

It has now been found that the action of rauwolfia (or reserpine) is potentiated when administered in combination with certain acetamides described below. The administration may be effected by combining the two ingredients in a single dosage-unit form or by administration of one, then the other [e.g. one may administer the rauwolfia (or reserpine) first, followed by administration of the acetamide in the desired quantity, then by rauwolfia (or reserpine) again as desired]. The daily dosage of rauwolfia of 30% concentration when used according to this invention is about 1–6 mg. (preferably about 2–4 mg.) and that of the purified reserpine, about 100–750 gamma. The daily dosage of the acetamide used with the alkaloid is approximately 100–700 mg.

The acetamides useful in the combinations of this invention may be represented by the general formula

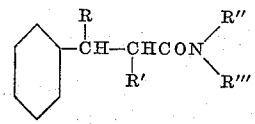

wherein R is a member of the group consisting of hydrogen and lower alkyl; and R', R" and R'" are each members of the group consisting of hydrogen, lower alkyl and allyl, the substituents being so chosen that R' is allyl only when R" and R'" are not allyl. These compounds may be produced in any desired manner. One method of preparing these compounds is described in application Serial No. 398,428, filed December 15, 1953, and now abandoned. Particularly effective for use in the invention are allylbenzylacetamide, allyl-alpha-phenethylacetamide, N,N-diallylbenzylacetamide and N,N-diethylallylbenzylacetamide, especially allylbenzylacetamide. Also useful in the invention are any of the other compounds disclosed in the above-mentioned U.S. application Serial No. 398,428.

The compositions of this invention may be prepared in any of the various dosage-unit forms for either oral use or intravenous injection. Thus, tablets may be prepared to preferably contain about 25–250 gamma reserpine (or ⅓–2 mg. rauwolfia) and about 25–250 mg. acetamide. This mixture of active ingredients may be compounded in the usual manner to contain fillers and/or binders such as starch, dextrose, stearates, carbonates, kaolin or talc, then compressed to form the tablets. Also the mixture of active ingredients, in combination with fillers, if desirable, may be encapsulated for ingestion using one or two piece gelatin capsules. Furthermore, the combinations may be dissolved or suspended for administration in liquid form; for example the combinations may be dispensed as elixirs. Such elixirs may obviously include flavoring materials and any other desirable additives. For intravenous injection, the combination may be dissolved in an inert solvent or solvent mixture and administered as such. A particular solvent mixture found effective for this purpose is one containing 50% water, 25% propylene glycol and 25% ethanol.

As has been indicated above, it is possible to administer the combinations of this invention by administering the components separately, for example, by first administering the rauwolfia (or reserpine), then the acetamide or vice versa. Utilizing such procedure, the potentiating effect of the acetamide on the alkaloid is clearly observed. However, it is simpler to utilize the combination simultaneously since this is the most economical method.

Numerous test data have been obtained showing the in vivo effectiveness of the combinations of the invention. For example, it has been found that rauwolfia injected intravenously in single doses in the normotensive dog has no appreciable blood pressure effect at unit dosages of 1.0–5.0 or more mg./kg. However, when such treatment follows administration of the acetamide, an immediately marked drop in pressure is observed. Following, in detail, are the procedures and results obtained by in vivo testing. The data clearly illustrate the unusual effects obtainable as a result of applicant's invention.

Dogs having normal blood pressure are injected intravenously with 0.5 or 1.0 mg./kg. rauwolfia in a solution containing 25% propylene glycol, 25% ethanol and 50% water. No appreciable pressure change occurs after ½ hour. Then, about 200–250 mg./kg. allylbenzylacetamide is administered orally to the animal. After 40 minutes, another dose of rauwolfia is administered. An immediate drop in blood pressure is observed lasting from 1 to 3 or more hours. Administration of additional dosages of rauwolfia, either before or after pressure recovery, produce further drops in blood pressure. The following are typical data obtained in carrying out the above described experiments with blood pressure values designated in millimeters of mercury.

*Experiment A*

| Control | I Rauwolfia, 1.0 mg./kg. I.V. | | | | II Allylbenzylacetamide, 50 mg./kg. orally (given 40 minutes after I) | | | | | III Rauwolfia, 1.0 mg./kg. I.V. (given 40 minutes after II) | | | | | | | IV Rauwolfia, 0.5 mg./kg. I.V. (given 1 hour after III) | | | | |
|---|---|---|---|---|---|---|---|---|---|---|---|---|---|---|---|---|---|---|---|---|---|
| 80 | [1]65 | 80 | 85 | 85 | 85 | 85 | 85 | 85 | 85 | 85 | 60 | 70 | 65 | 65 | 70 | 70 | 70 | 40 | 55 | 55 | 60 |
| Time (min.) 0 | 1 | 10 | 20 | 40 | 0 | 10 | 20 | 30 | 40 | 0 | 4 | 10 | 20 | 10 | 40 | 60 | 0 | 1 | 2 | 10 | 20 |

[1] This drop in pressure is transient, lasting only a few seconds.

Experiment B

| Control | I Rauwolfia, 0.5 mg./kg. I.V. | | | | | | II Allylbenzylacetamide, 25 mg./kg. orally (given 30 minutes after I) | | | | | III Rauwolfia 0.5 mg./kg. I.V. (given 70 minutes after II) | | | | |
|---|---|---|---|---|---|---|---|---|---|---|---|---|---|---|---|---|
| 100 | 100 | 70 | 110 | 100 | 95 | 95 | 95 | 90 | 95 | 95 | 90 | 80 | 60 | 85 | 60 | 45 |
| Time (min.) | 0 | 1 | 3 | 10 | 20 | 30 | 0 | 10 | 20 | 30 | 40 | 0 | 1 | 10 | 63 | 109 |

Tests have also been made with anesthetized dogs, using a combination of rauwolfia and allylbenzylacetamide for simultaneous oral administration. In these tests it has been found that administration of a mixture of 5 mg./kg. rauwolfia and 50 mg./kg. allylbenzylacetamide results in a gradual drop in blood pressure starting approximately 10 to 15 minutes after administration and lasting for more than 4 hours. The drop in pressure ranges from about 20 to 80 millimeters.

In addition the use of the rauwolfia-acetamide combination has been found to enhance the sedative-hypnotic effects obtained when rauwolfia is administered alone. Thus rauwolfia (5 mg./kg.) administered together with allylbenzylacetamide (50 mg./kg.) orally give the following effects (administration period: 3 days):

(a) More prompt onset of symptoms. Marked on second day.

(b) Greater intensity of symptoms. Depression is more severe. Relaxation of nictitating membrane is much more marked.

(c) Longer recovery time. Effects last 3–4 days longer than with rauwolfia alone.

On the basis of the illustrative data given, it is evident that applicants have made a valuable contribution to the medicinal art. Clearly, however, the invention may be variously otherwise embodied within the scope of the appended claims.

What is claimed is:

1. A composition of matter in dosage unit form for the control of hypertension containing in each dosage unit an amount of from about 25 to 250 gammas of reserpine and from about 25 to 250 milligrams of an acetamide of the group consisting of those having the formula:

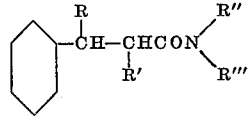

wherein R is a member of the group consisting of hydrogen and lower alkyl; and R', R'', and R''' are each members of the group consisting of hydrogen, lower alkyl and allyl, the substituents being so chosen that R' is allyl only when R'' and R''' are not allyl.

2. The composition of claim 1 wherein the acetamide is allyl-alpha-phenethylacetamide.

3. The composition of claim 1 wherein the acetamide is N,N-diallylbenzylacetamide.

4. The composition of claim 1 wherein the acetamide is N,N-diethylallylbenzylacetamide.

5. The composition of claim 1 wherein the acetamide is allylbenzylacetamide.

6. A composition of matter for the control of hypertension which comprises a mixture containing reserpine and alpha-allyl-alpha-benzylacetamide in relative proportions of 100 to 10,000 parts by weight of said alpha-allyl-alpha-benzylacetamide for each part of reserpine contained therein.

7. A method of reducing the blood pressure of animals having hypertension which comprises administering to the subject an effective amount of reserpine and a potentiating amount of an acetamide of the group consisting of those having the formula:

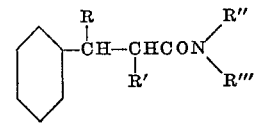

wherein R is a member of the group consisting of hydrogen and lower alkyl; and R', R'', and R''' are each members of the group consisting of hydrogen, lower alkyl and allyl, the substituents being so chosen that R' is allyl only when R'' and R''' are not allyl.

References Cited in the file of this patent

FOREIGN PATENTS

| 7,591 of 1911 | Great Britain | Nov. 16, 1911 |
| 368,590 | Great Britain | Mar. 19, 1932 |

OTHER REFERENCES

Remart: Annales des Chemie, vol. 8, Ser. 10 (1927), pp. 268, 272.

A.M. and C.T., III: 5, October 1956, p. 345.

Unlisted Drugs, 5:10, October 31, 1953, p. 145.

Wilkins: "Use of *Rauwolfia serpentina* in Hypertensive Patients," New Eng. J. of Med., January 8, 1953, pp. 48–53, esp. p. 52.

Rauvera (Dorsey): Modern Drugs, January 1954, p. 738.

Ciba, "The Rauwolfia Story," 63 p. booklet, Ciba Pharm. Prod., Inc., 1954, esp. pp. 46, 47.

Damm: "Ueber die Behandlung der art. Hypertonie mit Reserpin (Serpasil)," Dtsch. med. Wschr., vol. 79, January 1, 1954, pp. 39–41 (trans., 7 pp. plus 2 pp. tables).